(12) United States Patent
Hsu et al.

(10) Patent No.: US 7,974,660 B2
(45) Date of Patent: Jul. 5, 2011

(54) MOBILE DEVICE HOUSING WITH A DISPLAY UNIT AND METHOD FOR MAKING THE MOBILE DEVICE HOUSING

(75) Inventors: Che-Yuan Hsu, Taipei Hsien (TW); Ken-Holm Hansen, Faarevejle (DK)

(73) Assignee: FIH (Hong Kong) Limited, Kowloon (HK)

( * ) Notice: Subject to any disclaimer, the term of this patent is extended or adjusted under 35 U.S.C. 154(b) by 1008 days.

(21) Appl. No.: 11/831,927

(22) Filed: Jul. 31, 2007

(65) Prior Publication Data

US 2008/0239636 A1 Oct. 2, 2008

(30) Foreign Application Priority Data

Mar. 30, 2007 (CN) .......................... 2007 1 0073753

(51) Int. Cl.
*H04M 1/00* (2006.01)
*H04B 1/38* (2006.01)
(52) U.S. Cl. .................... 455/566; 455/90.3; 455/575.1; 455/575.8; 264/219; 264/272.11; 264/129; 349/58; 349/60
(58) Field of Classification Search .............. 455/90.3, 455/575.1, 575.8, 566; 349/58.6; 264/219, 264/225–226, 272.11, 129, 238
See application file for complete search history.

(56) References Cited

U.S. PATENT DOCUMENTS

| 3,702,289 | A | * | 11/1972 | Egnaczak ........................ 430/36 |
| 6,255,587 | B1 | * | 7/2001 | Lambert et al. ................ 174/541 |
| 6,850,780 | B1 | * | 2/2005 | Gioscia et al. ................. 455/566 |
| 7,466,961 | B1 | * | 12/2008 | Gioscia et al. ................... 455/73 |
| 2002/0037738 | A1 | * | 3/2002 | Wycherley et al. ........... 455/550 |
| 2006/0054484 | A1 | * | 3/2006 | Uleski et al. .................. 200/341 |
| 2007/0164975 | A1 | * | 7/2007 | Lim et al. ...................... 345/102 |
| 2007/0195252 | A1 | * | 8/2007 | Tsai et al. ...................... 349/143 |

FOREIGN PATENT DOCUMENTS

| CN | 2814580 Y | 9/2006 |
| CN | 2822938 Y | 10/2006 |

* cited by examiner

*Primary Examiner* — Rafael Pérez-Gutiérrez
*Assistant Examiner* — Lameka Kirk
(74) *Attorney, Agent, or Firm* — Jeffrey T. Knapp

(57) ABSTRACT

A housing assembly (100), used, e.g., in a mobile electronic device (300), includes a housing body (10) and a display unit (20). The housing body defines a display opening (110). The display unit contains electronic ink. The display unit is received in the display opening and is configured for providing information and/or graphics. The housing body moldingly receives the display lens therein, via an injection molding process.

14 Claims, 10 Drawing Sheets

MOBILE DEVICE HOUSING WITH A DISPLAY UNIT AND METHOD FOR MAKING THE MOBILE DEVICE HOUSING

CROSS-REFERENCE TO RELATED APPLICATIONS

This application is related to a co-pending U.S. patent application Ser. No. 11/551,675, entitled "COVER FOR A MOBILE DEVICE", by Chang-Qing Yang et al. This application has the same assignee as the present application, which has been filed on Oct. 20, 2006, and is also related to two other co-pending U.S. patent application Ser. Nos. 11/690,031, entitled "CAMERA HOUSING WITH A DISPLAY LENS, METHOD FOR MAKING THE CAMERA HOUSING, AND CAMERA USING THE HOUSING", by Jin-Feng Gao et al; and 11/752,904, entitled "MOBILE DEVICE HOUSING WITH A DISPLAY UNIT, AND METHOD FOR MAKING THE MOBILE DEVICE HOUSING", by Jin-Feng Gao et al. The above-identified applications are incorporated herein by reference.

BACKGROUND OF THE INVENTION

1. Field of the Invention

The present invention relates to mobile device housings and, particularly, to a mobile device housing with a display unit and to a method for making the housing.

2. Description of Related Art

Nowadays, many electronic devices such as mobile phones can have many varieties of display units mounted therein, so as to enable them to provide information and/or graphics thereon.

A conventional housing for an electronic device includes a housing portion and a display unit portion. The housing portion and the display unit portion are, respectively, manufactured in two separate molding processes. Thus, the display unit is desirably attachable to the housing portion, in order to prevent movement of the display unit during use/operation.

Methods for affixing/mounting the display unit to the housing portion usually include attachment by using adhesive. However, eventually, the display unit of the housing may rather easily become detached from the housing body, as the effectiveness of the adhesive can decrease over a period of time. As a result of even partial detachment, moisture, dust, and/or other contaminants in the ambient air can enter into electronic elements received in the housing and potential damage the electronic elements. Of course, complete detachment would create a greater risk of damage of both the display unit and the housing. In other alternative processes, small bolts have been used to fasten the display unit to the housing portion. However, the display unit may be damaged during the bolting process. Additionally, bolted components typically do not have the degree of sealing therebetween that adhesively bonded parts do. Furthermore, the housing portion and the display unit are made in two separate processes, which means that additional time is required to properly adhere and/or fasten the display unit to the housing portion.

Additionally, the display unit usually includes light-emitting diode (LED) or liquid-crystal display (LCD). When the display unit is in use, the light-emitting diode or liquid-crystal display requires an uninterrupted power supply in order to display information and/or graphics. Thus, the display unit requires a relatively large amount of electric power.

Therefore, an improved mobile device housing with a display unit is desired in order to overcome the above-described shortcomings.

SUMMARY OF THE INVENTION

In one present embodiment thereof, a housing configured (i.e., structured and arranged) for enclosing a mobile device is provided. The housing includes a housing body and a display unit. The housing body defines a display opening. The display unit contains electronic ink. The display unit is received in the display opening and is configured for providing information and/or graphics. The housing body moldingly receives the display lens therein, via an injection molding process.

Other advantages and novel features will become more apparent from the following detailed description of the present embodiments when taken in conjunction with the accompanying drawings.

BRIEF DESCRIPTION OF THE DRAWINGS

Many aspects of the present mobile device housing with a display unit can be better identified with reference to the following drawings. The components in the drawing are not necessarily drawn to scale, the emphasis instead being placed upon clearly illustrating the principles of the mobile device housing with the display unit. Moreover, in the drawing like reference numerals designate corresponding parts throughout the several drawings.

DETAILED DESCRIPTION OF THE INVENTION

Figure 1:
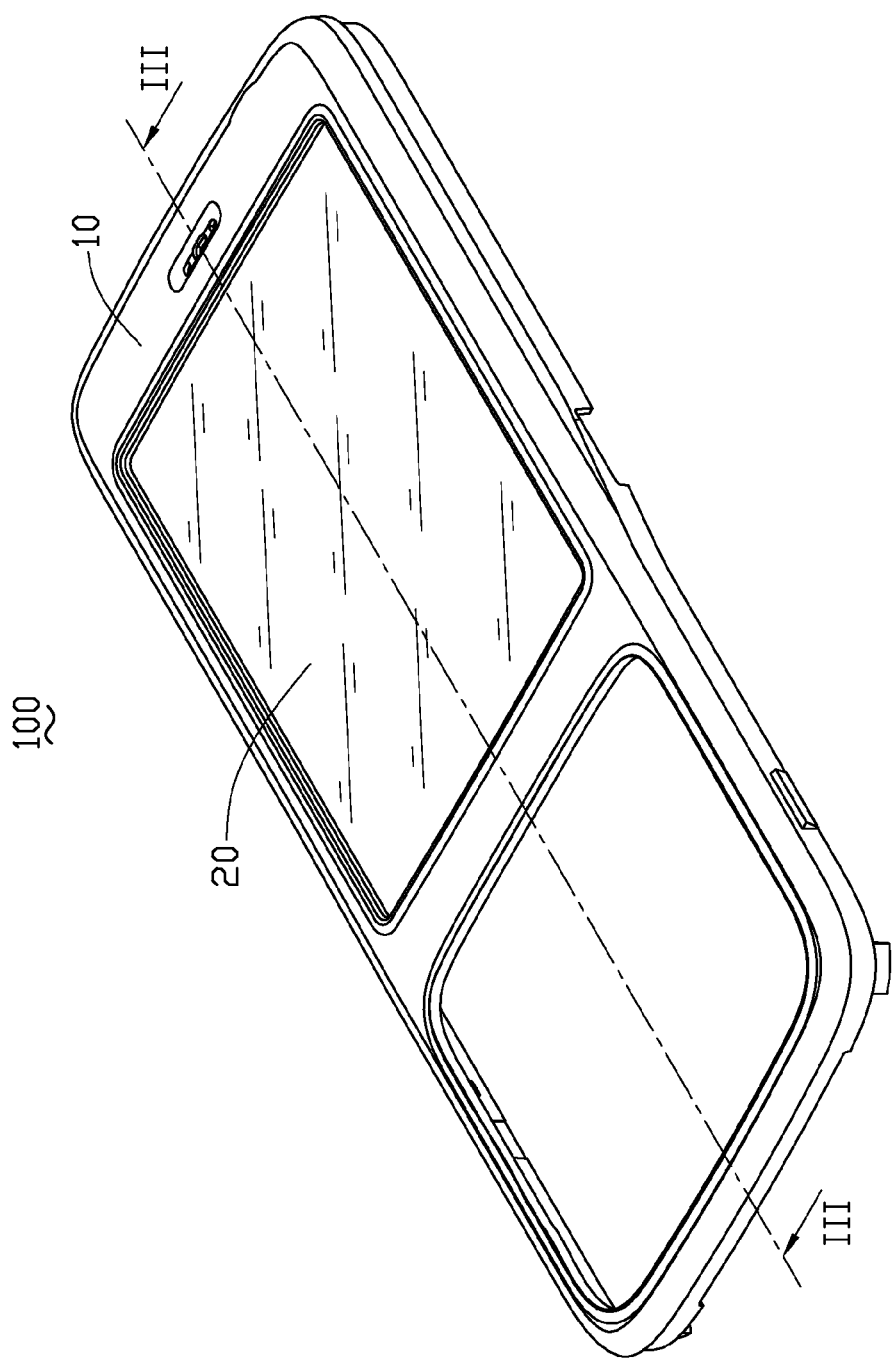
FIG. 1 is a perspective view of a present embodiment of a housing for a mobile device.

Referring to FIG. 1, in one present embodiment, a housing assembly 100 for a mobile device (not shown in FIG. 1), e.g. a mobile phone, PDA, or digital camera, includes at least a housing body 10 and a display unit 20. The display unit 20 is received in the housing body 10.

Figure 2:
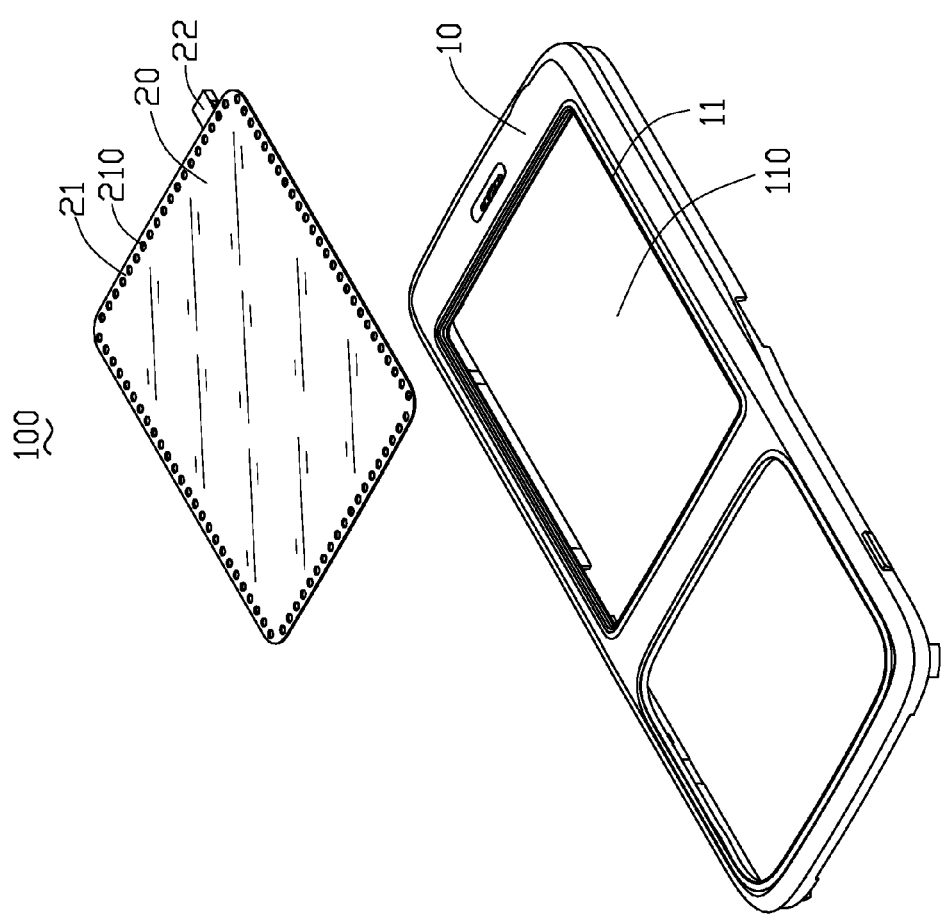
FIG. 2 is an exploded view of the housing, as shown in FIG. 1.

Referring to FIG. 2, the housing body 10 is advantageously made of a plastic material. The plastic material can, e.g., be chosen from the following group: polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, polypropylene, and any desired combination thereof. The housing body 10 has an inner rim portion 11, defining a display opening 110 configured for receiving the display unit 20.

The display unit 20 may, beneficially, contain electronic ink and thereby use such electronic ink to display characters and images. Such electronic ink is advantageous, at least in part, because it can be readily printed on the display unit 20 and since it is thin and substantially flexible. The display unit 20 has an outer rim portion 21, projecting from a flange thereof. The outer rim portion 21 has a plurality of through holes 210 formed therein. The display unit 20 has an electric connector 22 formed on one portion of the flange thereof. The electric connector 22 is configured for electrically connecting the display unit with, e.g., a printed circuit board or any other electronic elements (none shown) received in the housing 100.

Figure 3:
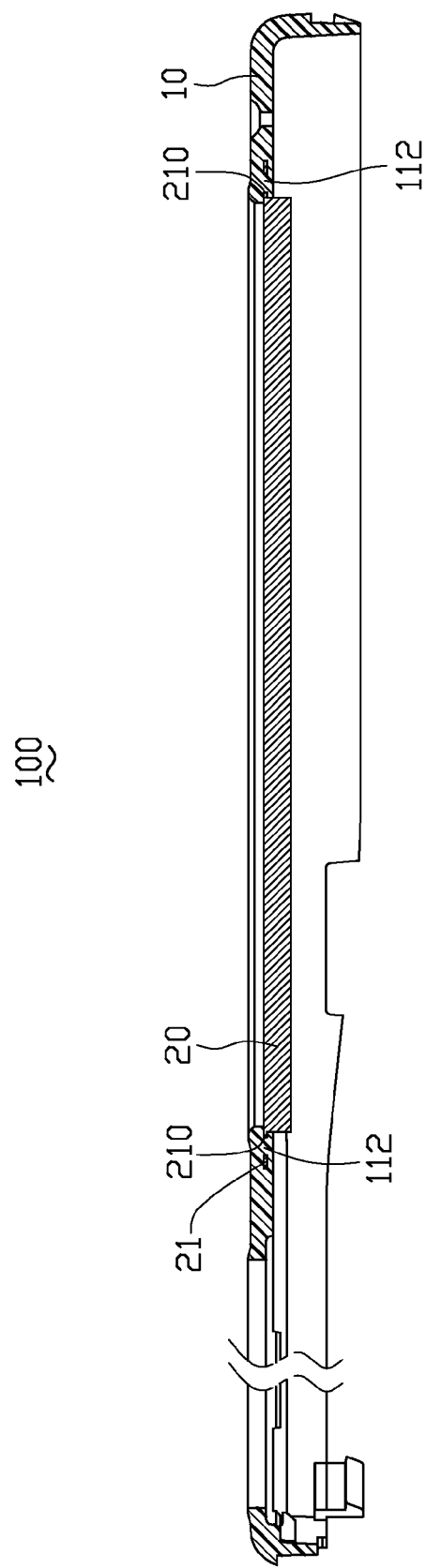
FIG. 3 is a cross-sectional view of the housing, taken along line III-III in FIG. 1.

Referring to FIG. 3, the housing body 10 is moldingly attached (i.e., co-molded) with the display unit 20, with the display unit 20 being received in the display opening 110 of the housing body 10. The molding step insures that the outer rim portion 21 of the display unit 20 is inserted into (i.e., fittingly received within) the inner rim portion 11 of the housing body 10, with at least one injection body 112 of the inner rim portion 11 being engaged in a respective through hole 210 of the outer rim portion 21. Thus, an interference/sealing fit between the display unit 20 and the display opening 11 of the housing body 10 is achieved, providing an airtight and dustproof fit for the housing assembly 100. Furthermore, each injection body 112 is formed during molding and extends through a respective through hole 210. As such, each injection body 112 is a molded through-pin integral with the inner rim portion 11 of the housing body 10 and helps to ensure and maintain the alignment of the display unit 20 relatively to the housing body 10. It should be understood that the compatibility of the materials used for the housing body 10 and the display unit 20 could effectively create/yield a plastic weld between such elements.

Additionally, since the display unit 20 is an electronic-ink display unit, when compared to the conventional displays, such as light-emitting diode displays and liquid crystal displays, the display unit 20 is generally lighter and thinner and requires less electric power to operate, due, at least in part, to the use of the electronic ink therein. Furthermore, the display unit 20 can be bent before being received in the housing body 10. Thus, the housing assembly 100 can be made in different shapes.

Figure 4:
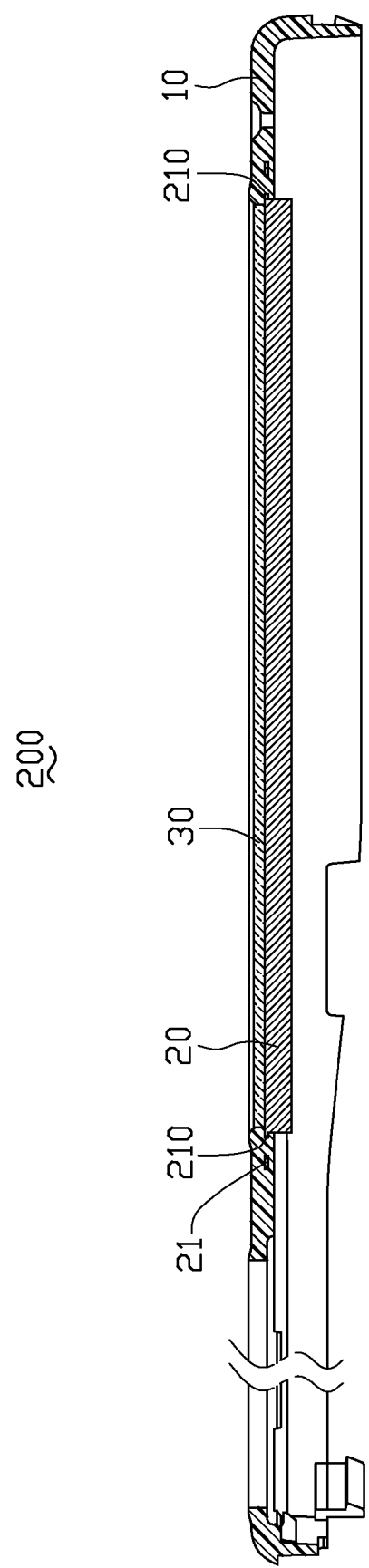
FIG. 4 is a cross-sectional view of another present embodiment of a housing for a mobile device.

Referring to FIG. 4, in another present embodiment, a housing assembly 200 is similar to the housing assembly 100 yet may further include a display lens 30. The display lens 30 is also received in the display opening 11 and covers the display unit 20, so as to protect the display unit 20 from being scratched. It should be understood that such a display lens 30 might additionally be designed to improve one or more optical properties (e.g., glare-reduction, color and/or UV filtering, display magnification, etc.). The housing body 10 is moldingly attached to the display unit 20 and the display lens 30. Alternatively, the view lens 30 can additionally be fixed to the housing body 10 with adhesive.

Figure 5:
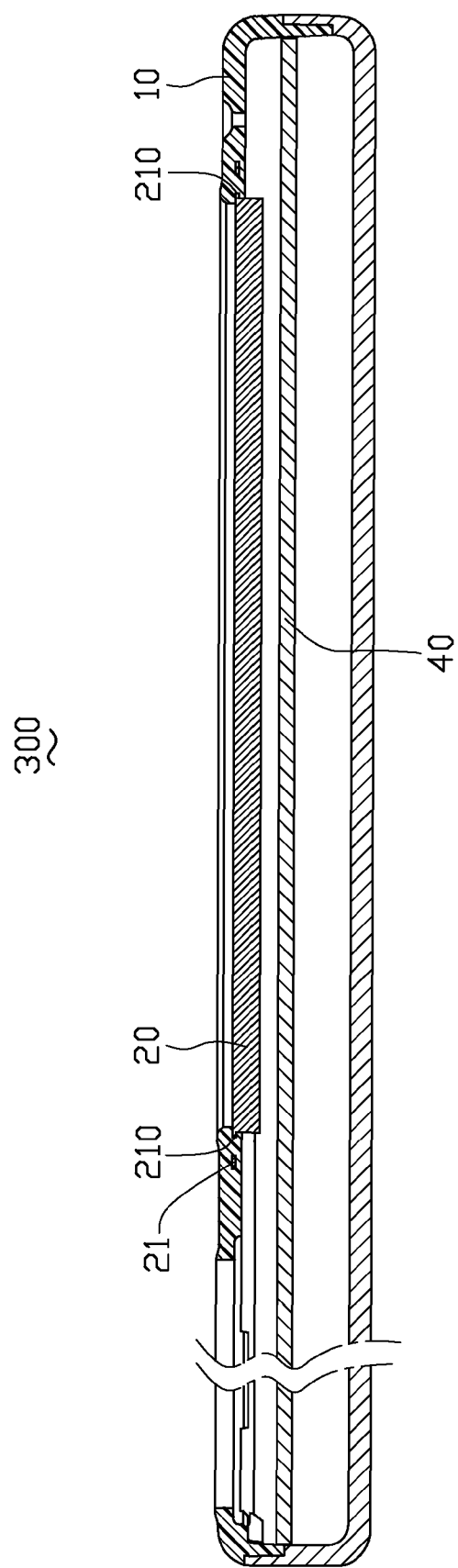
FIG. 5 is a cross-sectional view of an electric device using the housing as shown in FIG. 1, shown in phantom to schematically indicate the electronic device in its fully assembled state.

Referring to FIG. 5, the housing assembly 100 can be used in an electronic device (e.g., a mobile phone, digital camera, or PDA) 300, with a printed circuit board 40 received therein. The electrical connector 21 of the display unit 20 is electrically connected to the printed circuit board 40, so as to enable the display unit 20 to provide information or graphics thereon, as instructed via the printed circuit board 40.

A suitable method for making the housing assembly 100 is provided. Firstly, the display unit 20 is provided. The display unit 20 can advantageously be an electronic-ink display unit.

Figure 6:
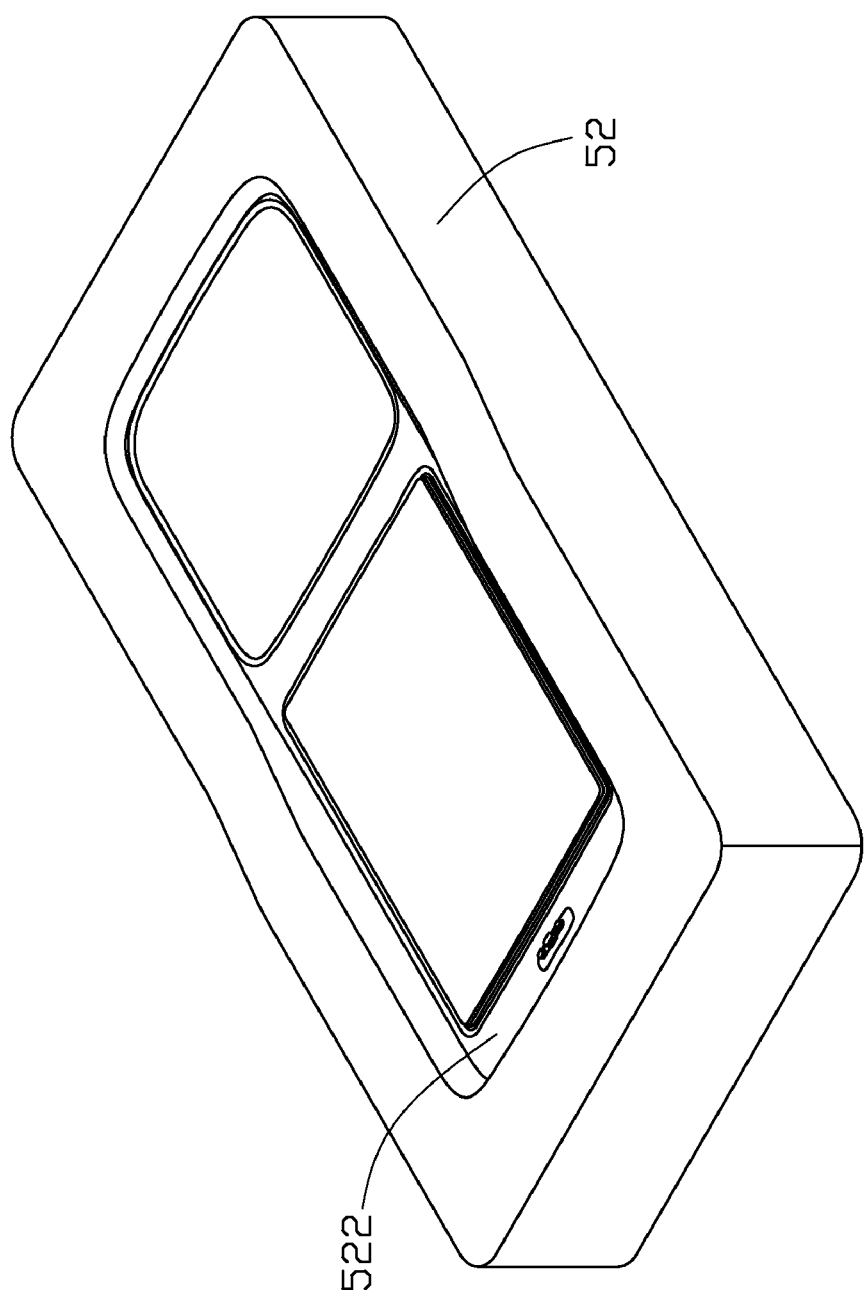
FIG. 6 is a schematic view of a female mold of an injection mold for making the housing in FIG. 1.
Figure 7:
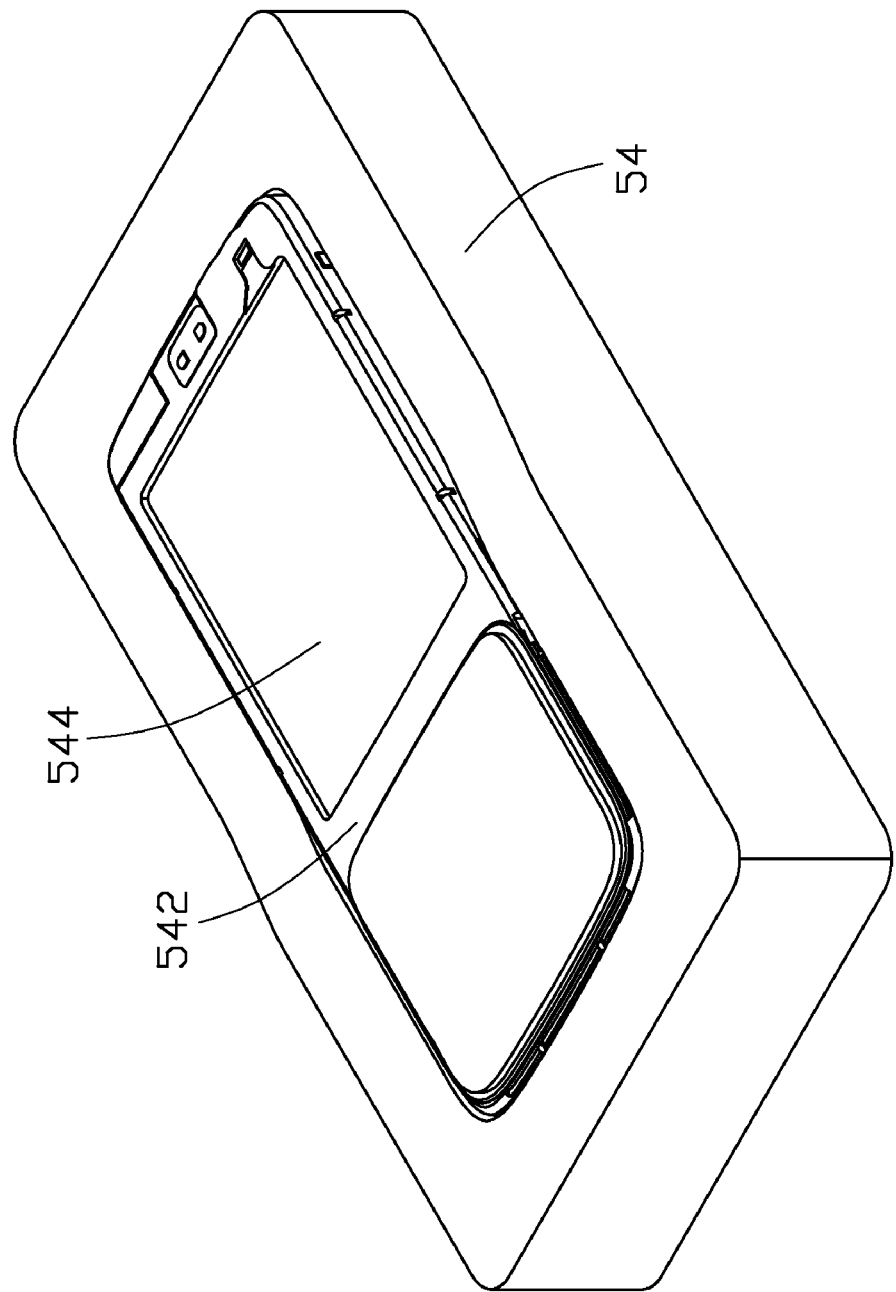
FIG. 7 is a schematic view of a male mold of the injection mold for making the housing in FIG. 1.
Figure 8:
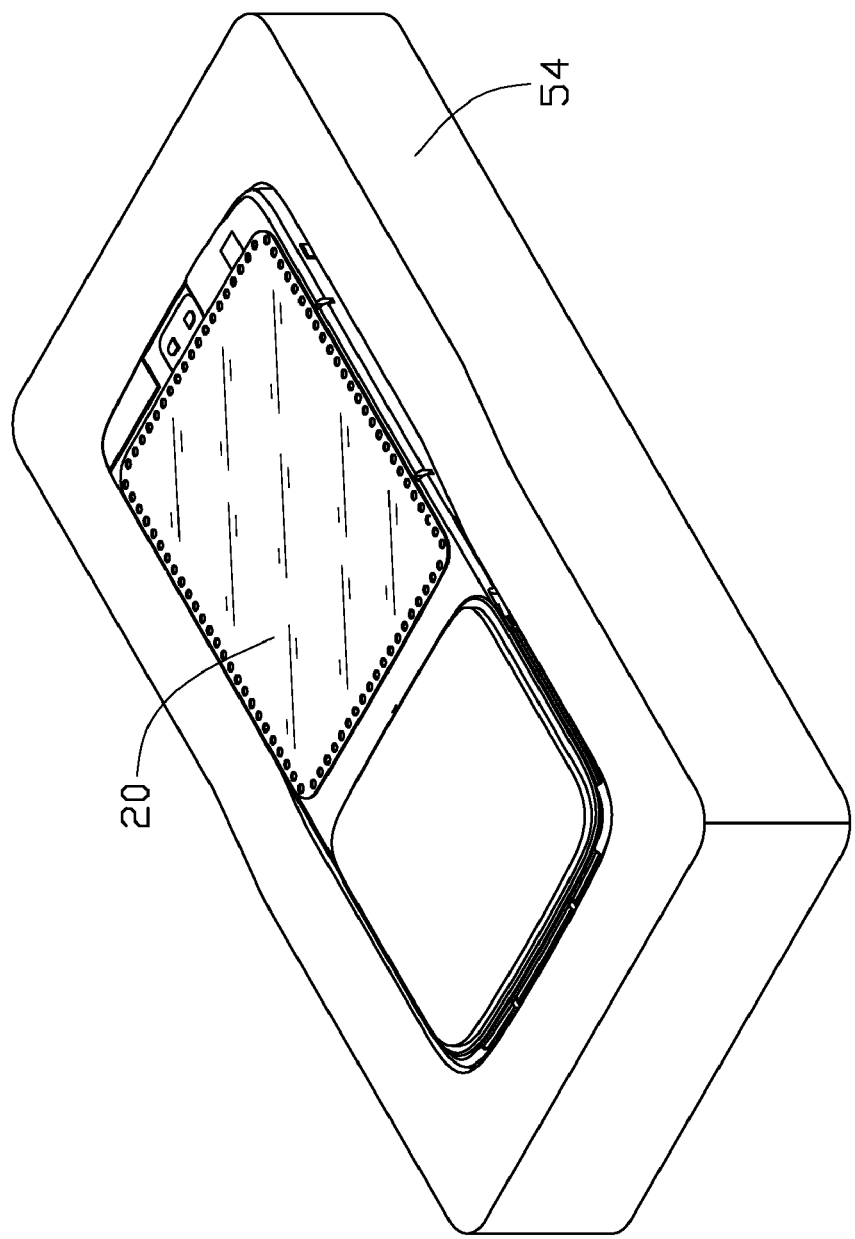
FIG. 8 is a schematic view of the male mold in FIG. 7, with a display unit being affixed/mounted therein.

Secondly, an injection mold is provided. Referring to FIG. 6 and FIG. 7, the injection mold includes a female mold 52 and a male mold 54. The female mold 52 has a recessed portion 522 formed therein. The male mold 54 has a mold core 542 mounted thereon. The mold core 542 has a receiving groove 544 formed therein and is configured for partially receiving the display unit 20. The male mold 54 is matingly engageable with the female mold 52.

Thirdly, a bottom portion of the display unit 20 is fixed into the receiving groove 544 of the molding core 542, with a top portion of the display unit 20 projecting out of the molding core 542.

Figure 9:
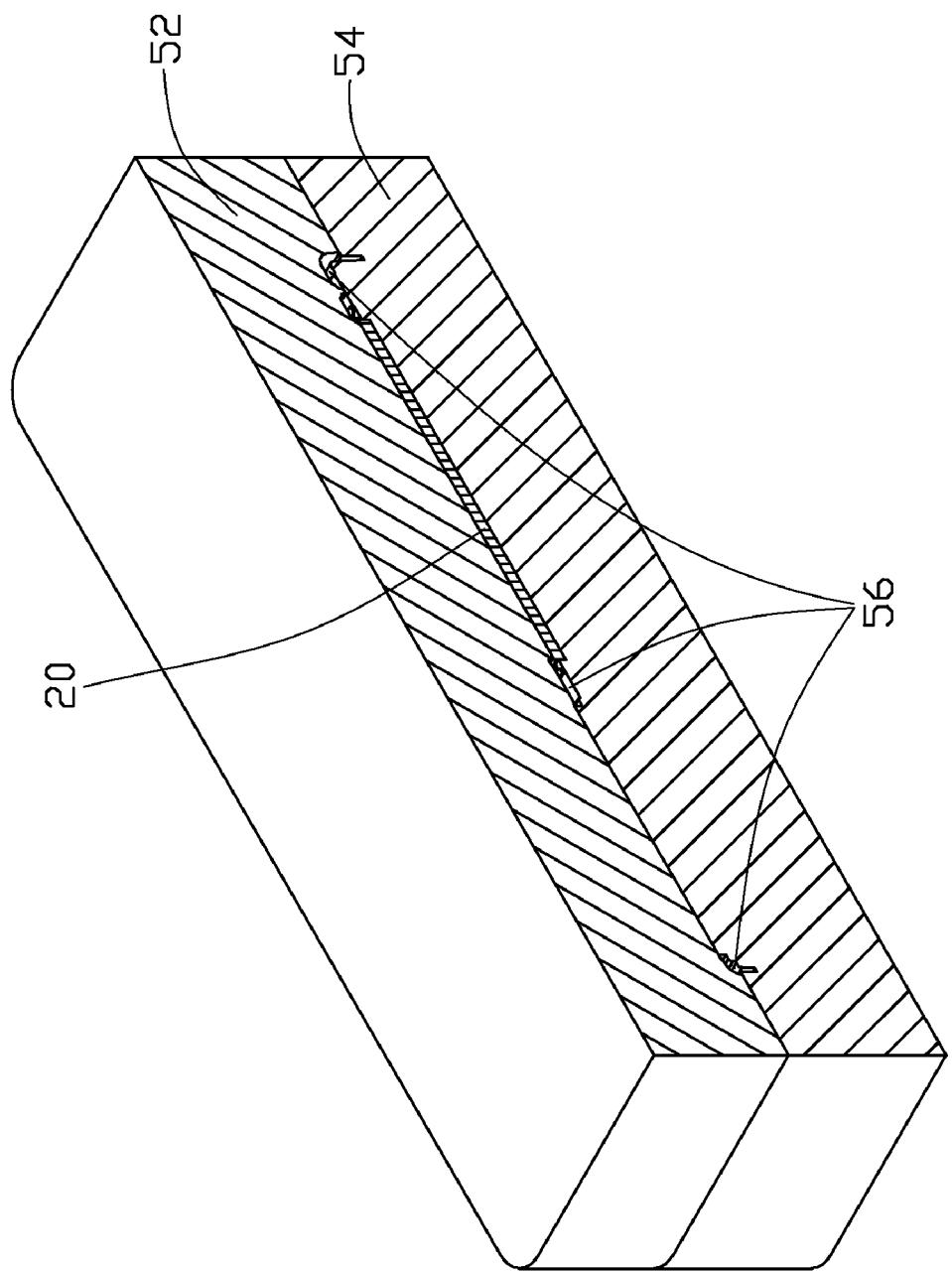
FIG. 9 is a schematic, isometric, cross-sectioned view of the female mold in FIG. 6 and the male mold in FIG. 7, being used together, shown in a closed state.
Figure 10:
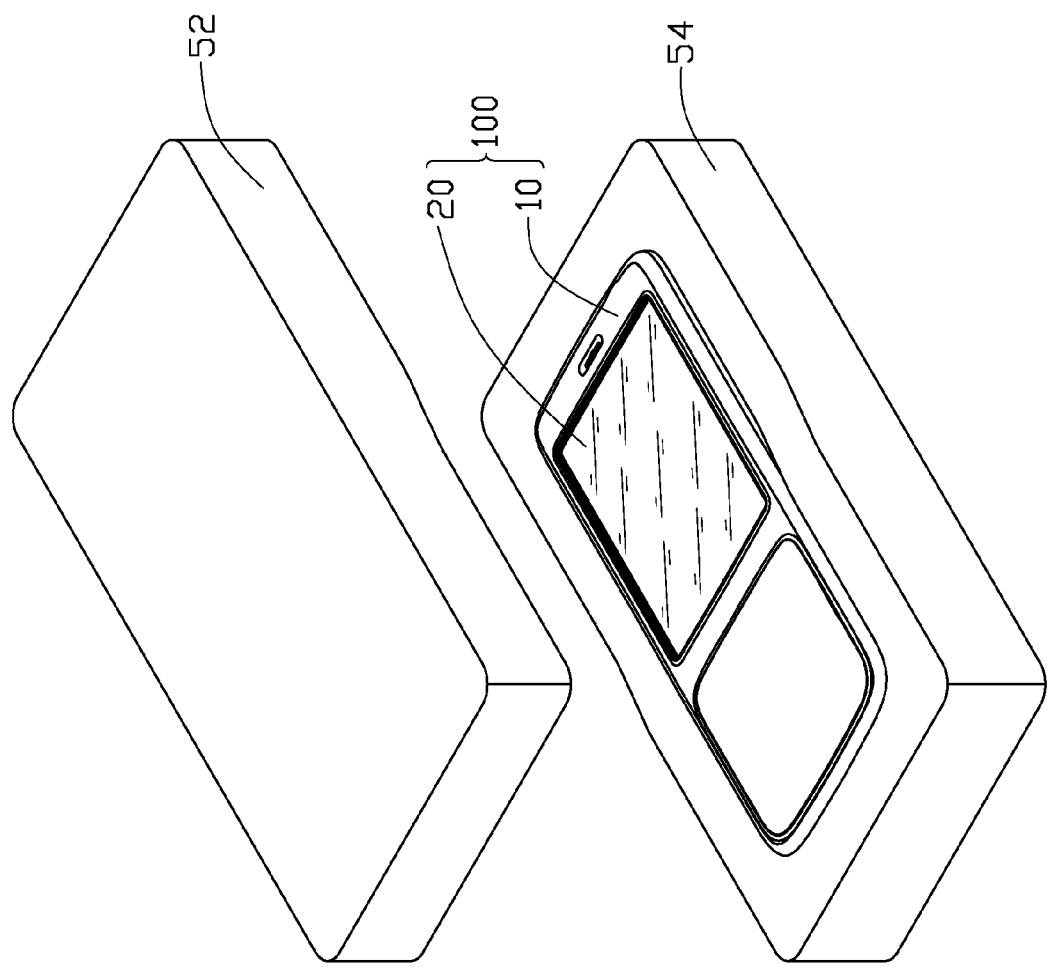
FIG. 10 is a schematic view of the female mold and the male mold of FIG. 9, with the housing molded therein.

Fourthly, referring to FIG. 9, the injection mold 50 is closed by engaging the male mold 54 with the female mold 52. Thus, a molding cavity 56 is defined. Fifthly, molten plastic is injected into the molding cavity 56. Thus, the housing body 10 is moldingly attached by injection molding to (i.e., fittingly formed around) the display unit 20 in the molding cavity 56, with at least one injection body 112 being concurrently formed during molding and thereby extending through a corresponding through hole 210. Such injection bodies 112 help hold the display unit 20 in place relative to the housing body 10. The housing body 10 is preferably made of a plastic material, as described above. If the materials of the housing body 10 and the display unit 20 suitably match, a plastic weld therebetween may concurrently result.

Finally, the injection mold has cooled down, and the housing assembly 100, including the housing body 10 and the display unit 20, is obtained.

It should be understood that the display unit 20 is fixed to the housing body 10 by such an injection molding process, effectively creating an interference fit, and, quite likely, a plastic weld there between. Thus, in the process of making the housing assembly 100, it is unnecessary to further fix the display unit 20 to the housing body 10 by using an additional adhesive and/or small bolts. The display unit 20 and the housing body 10 can be joined together with a concordant seal without gap. As such, the cover can obtain a highly airtight, water-resistant, and dustproof seal.

It should be understood that even though numerous characteristics and advantages of the present embodiments have been set forth in the foregoing description, together with details of the structures and functions of the embodiments, the disclosure is for illustrative only, and changes may be made in detail, especially in matters of shape, size, and arrangement of parts within the principles of the invention. All such modification and variation are indicated to the full extent by the broad general meaning of the terms in which the appended claims are expressed.

What is claimed is:

1. A housing for a mobile device comprising:
   a housing body defining a display opening therein; and
   a display unit containing electronic ink, the display unit having a plurality of through holes defined and being moldingly secured in the housing body within the display opening,
   wherein the display unit has a flange and an outer rim portion projecting from the flange, the outer rim portion having a plurality of through holes formed therein, the housing body defining an inner rim portion, the inner rim portion having, the at least one injection body integrally formed therewith, the outer rim portion of the display unit being received within the inner rim portion of the housing body, with at least one injection body of the inner rim portion being engaged in a respective through hole of the outer rim portion.

2. The housing as claimed in claim 1, wherein the housing body is made of a plastic material.

3. The housing as claimed in claim 1, wherein the display unit has an electrical connector formed on one end thereof.

4. The housing as claimed in claim 1, further including a display lens received in the display opening, the display lens being configured for protecting the display unit.

5. The housing as claimed in claim 4, wherein the display lens covers the display unit, the housing body moldingly receiving the display lens.

6. The housing as claimed in claim 4, wherein the display lens covers the display unit and is fixed to the housing body with an additional adhesive.

7. A mobile electronic device, comprising:
   a printed circuit board; and
   a housing receiving the printed circuit board, the housing comprising:
      a housing body carrying printed circuit board, the housing body further defining a display opening; and
      a display unit containing electronic ink and being electrically connected to the printed circuit board so as to enable the display unit to provide graphical information, the display unit having a plurality of through holes defined and being moldingly secured in the housing body within the display opening, the housing body comprising at least one injection body moldingly latched in the corresponding at least one of the through holes.

8. The mobile electronic device as claimed in claim 7, wherein the housing body is made of a plastic material.

9. The mobile electronic device as claimed in claim 7, wherein the display unit has an electrical connector formed on one end thereof, the electrical connector being electrically connected to the printed circuit board.

10. The mobile electronic device as claimed in claim 7, wherein the housing further includes a display lens received in display opening, the display lens being configured for protecting the display unit.

11. The mobile electronic device as claimed in claim 10, wherein the display lens covers the display unit, the housing body moldingly receiving the display lens.

12. The mobile electronic device as claimed in claim 10, wherein the display lens covers the display unit and is fixed to the housing body via an additional adhesive.

13. A method for making a housing assembly, comprising the steps of:
   providing a display unit having a plurality of through holes defined; inserting the display unit into a mold, with a mold cavity defined in the mold; and
   injecting a molten plastic into the mold cavity to form a housing body, with the housing body resultantly being moldingly attached to the display unit,
   wherein the display unit has a flange and an outer rim portion projecting from the flange, the outer rim portion having a plurality of the through holes formed therein, at least one injection body of the housing body being concurrently formed during molding and extending through a respective one of the through holes.

14. The method as claimed in claim 13, wherein the display unit contains electronic ink.

\* \* \* \* \*